United States Patent

Borden et al.

[11] Patent Number: 6,066,032
[45] Date of Patent: May 23, 2000

[54] WAFER CLEANING USING A LASER AND CARBON DIOXIDE SNOW

[75] Inventors: Michael R. Borden; Thomas J. Kosic, both of Redondo Beach; Charles W. Bowers, Torrance, all of Calif.

[73] Assignee: Eco Snow Systems, Inc., Livermore, Calif.

[21] Appl. No.: 08/850,874

[22] Filed: May 2, 1997

[51] Int. Cl.$^7$ ............................................. B24C 3/08
[52] U.S. Cl. .................. 451/80; 134/1; 134/1.3; 134/6; 134/7; 134/19; 134/38; 451/39
[58] Field of Search ............... 134/1, 1.3, 6, 7, 134/19, 38; 451/38, 39, 75, 78, 102, 87, 80

[56] References Cited

U.S. PATENT DOCUMENTS

| | | | |
|---|---|---|---|
| 3,903,526 | 9/1975 | Cotter | 451/102 |
| 4,984,396 | 1/1991 | Urakami | 451/102 |
| 5,024,968 | 6/1991 | Engelsberg | 134/1.3 |
| 5,209,028 | 5/1993 | McDermott et al. | 51/426 |
| 5,217,925 | 6/1993 | Ogawa et al. | 451/87 |
| 5,316,970 | 5/1994 | Batchelder et al. | 437/173 |
| 5,372,652 | 12/1994 | Srikrishnan et al. | 134/7 |
| 5,571,335 | 11/1996 | Lloyd | 134/1 |
| 5,613,509 | 3/1997 | Kolb et al. | 134/56 R |
| 5,643,472 | 7/1997 | Engelsberg et al. | 134/1 |
| 5,662,762 | 9/1997 | Ranalli | 156/344 |
| 5,669,979 | 9/1997 | Elliott et al. | 134/1.3 |

*Primary Examiner*—Jill Warden
*Assistant Examiner*—Sharidan Carrillo
*Attorney, Agent, or Firm*—R. Craig Armstrong

[57] ABSTRACT

Apparatus and methods for removing particles from a surface of a semiconductor wafer or optical component using a carbon dioxide snow spray directed at the wafer or component while simultaneously irradiating the surface with a laser beam. The apparatus comprises a carbon dioxide jet spray cleaning system disposed within an environmental cleaning station of a processing system that processes the wafer or component. The processing system is a conveyorized system wherein a conveyor belt or web transports wafers or components from processing station to processing station. The cleaning station includes a recirculating blower system, a laminar flow screen, a high efficiency particulate air filter, and a ducting system for recirculating purified air or inert gas. The cleaning station contains a jet spray nozzle that produces a carbon dioxide snow spray. The jet spray nozzle is coupled by way of a manifold to a liquid carbon dioxide tank that supplies liquid carbon dioxide to the jet spray nozzle. The wafer or component is grounded to prevent static charge buildup. A carbon dioxide laser, operating at 10.6 microns, produces a laser beam that is generally aligned with the carbon dioxide snow spray so that the beam and spray overlap. The laser beam heats the surface of the wafer or component to compensate for the cooling effects of the carbon dioxide snow.

3 Claims, 1 Drawing Sheet

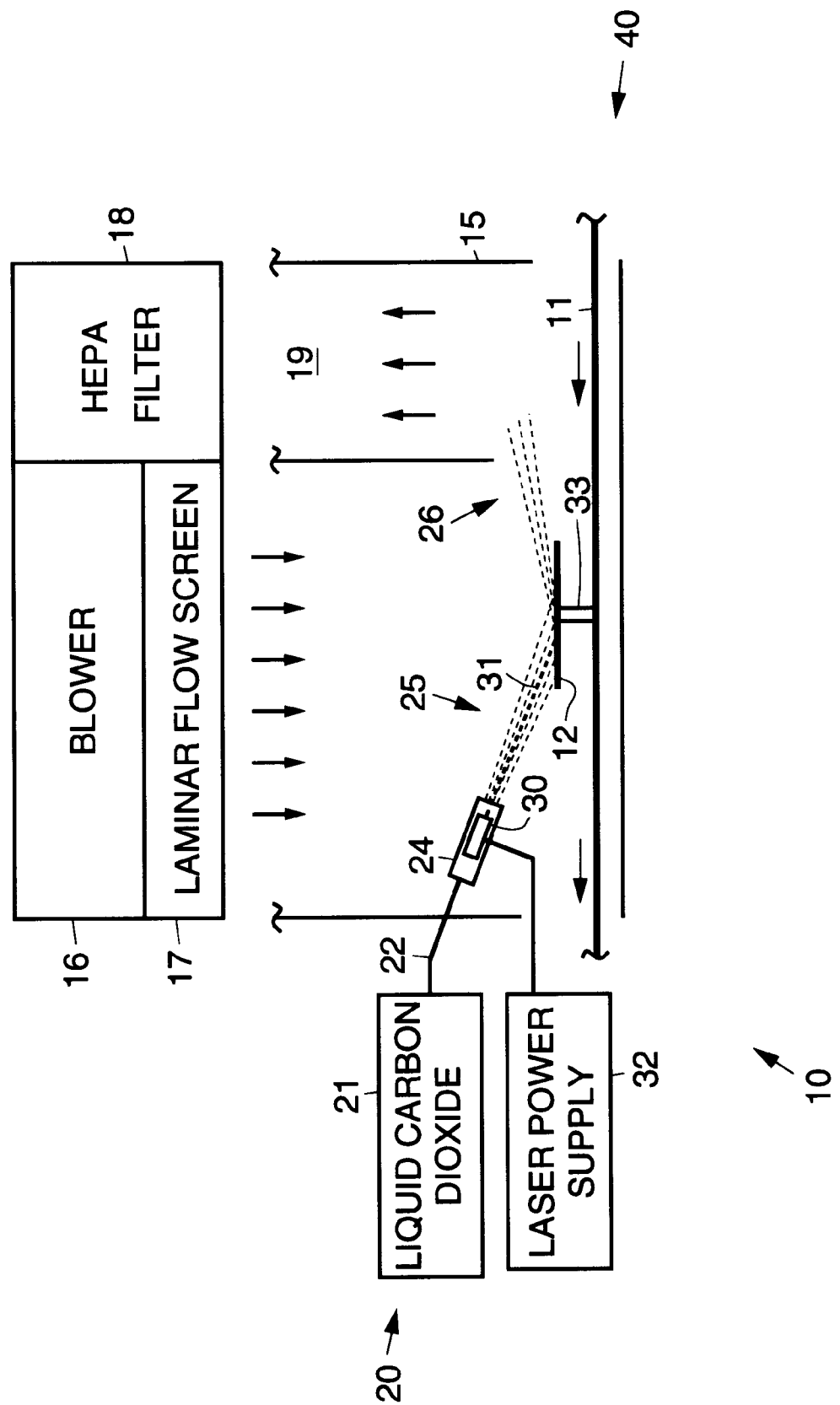

WAFER CLEANING USING A LASER AND CARBON DIOXIDE SNOW

BACKGROUND

The present invention relates generally to cleaning systems, and more particularly, to a liquid carbon dioxide jet spray cleaning system and method employing a laser and carbon dioxide snow to clean semiconductor wafers and optical components, and the like, that are adversely affected by rapid or excess cooling.

During manufacturing, silicon and other semiconductor wafers and other precision electronics, optical components and optical systems, such as magnetic media and flat panel displays, and the like, carry contaminants along with them in the form of particulate matter and dust. The contaminant particulate matter can find its way onto and into components during manufacture. This can potentially result in damaged components or systems, and can lead to low manufacturing yields.

Furthermore, many of these types of components are sensitive to rapid cooling and relatively low temperatures. For example, thermal shock resulting from rapid cooling tends to cause small cracks in semiconductor wafers. Causing damage to precision electronic and optical components as a result of cleaning is not an acceptable practice.

Consequently, it would be advantageous to have an apparatus and methods for cleaning semiconductor and optical components, and the like, and that are particularly sensitive to the effects of rapid cooling. Accordingly, it is an objective of the present invention to provide for such an apparatus and methods.

SUMMARY OF THE INVENTION

To meet the above and other objectives, the present invention provides for apparatus and methods for removing particulate contamination from a surface of a semiconductor wafer, such as a silicon wafer, or optical component, for example, using a stream of carbon dioxide snow directed at the wafer while simultaneously irradiating the surface of the wafer or component with a laser beam.

The apparatus comprises a carbon dioxide jet spray cleaning system disposed within an environmental cleaning station of a processing system that processes the semiconductor wafer or optical component. The processing system is a conveyorized system wherein a conveyor belt or web transports semiconductor wafers or optical components from processing station to processing station. The cleaning station includes a recirculating blower system, a laminar flow screen, a high efficiency particulate air (HEPA) filter, and a ducting system for recirculating purified air or inert gas. The environmental cleaning station provides a dry atmosphere so that condensation does not occur on the wafer or component, which would result in recontamination.

The cleaning station is generally disposed above the web, and contains a jet spray nozzle that produces a carbon dioxide snow spray. The jet spray nozzle is coupled by way of a manifold to a liquid carbon dioxide tank that supplies liquid carbon dioxide to the jet spray nozzle. The wafer or component is grounded to prevent static charge buildup which attracts dislodged contaminating particles. This is accomplished using a vacuum chuck wafer holder that is grounded.

The present invention also comprises a carbon dioxide ($CO_2$) laser, operating at 10.6 microns, that is generally aligned with the carbon dioxide snow spray so that the laser beam and spray partially or completely overlap. The heating of the surface of the semiconductor wafer or optical component by the laser beam compensates for the cooling effects of the carbon dioxide snow, while the snow is rastered over the hardware as it is cleaned. The size of the laser beam may be expanded to optimize heating of an area that is cooled by the snow spray. There is no absorption of the carbon dioxide snow at this wavelength because the extinction coefficient k<0.0001. Consequently, the carbon dioxide snow spray has no effect on transmission of the laser beam.

The jet spray nozzle is disposed above the semiconductor wafer or optical component that is to be cleaned, and is used to spray carbon dioxide snow onto the wafer or component as it moves past the nozzle. The grounded vacuum chuck wafer holder removes electrostatic charge that builds up on the wafer or component as it is sprayed with the carbon dioxide snow. Also, the cleaning environment is dry to eliminate condensation on the wafer or component.

The cleaning method involves spraying the wafer or component with a carbon dioxide snow spray at a shallow angle, approximately thirty degrees relative to horizontal, which effectively dislodges particles from the surface of the wafer or component. The spray is directed so that any contaminating particles dislodged from the wafer or component, or interior walls of the environmental cleaning station, are captured by the recirculating air system which filters the air before it re-enters the cleaning station. This process is successful in removing greater than ninety-five percent of all particles smaller than ten microns from contaminated wafers or component.

The use of the carbon dioxide laser compensates for the cooling effects of the carbon dioxide snow when it impacts the wafer or component during cleaning. Certain hardware, such as precision guidance system components and electronic devices, and in particular semiconductor wafers, are especially sensitive to overcooling. The heating effects of the laser beam compensate for the cooling effects of the carbon dioxide snow spray, while the snow is rastered over the wafer or component as it is cleaned.

The laser beam provided by the carbon dioxide laser also vaporizes capillary liquid on the wafer or component, which reduces capillary forces that tend to secure contaminating particles to the surface of the wafer or component. The surface of the wafer or component is heated to a preferred temperature (40 degrees Celsius), which permits the supercritical carbon dioxide spray to operate as a better organic solvent. The laser beam also imparts thermal energy to dislodged contaminating particles, which helps to remove them from the surface of the wafer or component. Also, the laser beam reheats the surface of the wafer or component after cleaning to help to return the wafer or component to ambient temperature.

The present invention has significant advantages over the competing technology which involves using a heated stream of air to preheat and postheat cleaned hardware to compensate for the cooling effects of the carbon dioxide snow. Foremost, the laser heating approach of the present invention maintains a narrower temperature variation, since areas of the hardware are not heated and cooled separately. Also, positioning of the laser relative to the wafer or component is much less sensitive using the laser heating approach of the present invention than heating devices used in prior systems.

BRIEF DESCRIPTION OF THE DRAWINGS

The various features and advantages of the present invention may be more readily understood with reference to the following detailed description taken in conjunction with the accompanying drawing figure, which is a side view of apparatus in accordance with the principles of the present invention.

DETAILED DESCRIPTION

Referring to the drawing figure, it shows a side view of apparatus 10 in accordance with the principles of the present invention. The apparatus 10 comprises a carbon dioxide jet spray cleaning system 20 having a jet spray nozzle 24 disposed within an environmental cleaning station 15 of a processing system 40 that processes semiconductor wafers 12 or other components 12. The apparatus 10 removes particulate contamination 26 from a surface of the semiconductor wafers 12 using a spray 25 of carbon dioxide snow directed at the wafer 12 while simultaneously irradiating the surface of the wafer 12 or component 12 with a laser beam 31. The semiconductor wafer 12 may comprise a silicon wafer, or an optical component, for example.

The processing system 40 is a conveyorized system wherein a moving web 11, such as a moving conveyor belt 11, for example, transports a semiconductor wafer 12 or other component 12 from processing station to processing station. The web 11 is caused to move through the cleaning station 15 in which the present invention is implemented.

The cleaning station 15 includes a recirculating blower system 16, a laminar flow screen 17, a high efficiency particulate air (HEPA) filter 18, and a ducting system 19 for recirculating purified air or inert gas. The cleaning station 15 is disposed adjacent to or above the moving web 11 and contains the jet spray nozzle 24. The jet spray nozzle 24 is coupled by way of a liquid carbon dioxide manifold 22 to a liquid carbon dioxide tank 21 that supplies liquid carbon dioxide to the jet spray nozzle 24.

The jet spray nozzle 24 is used to generate the carbon dioxide snow spray 25 that impinges on the semiconductor wafer 12 or component 12 as the web 11 moves them through the cleaning station 15. The carbon dioxide snow spray 25 from the jet spray nozzle 24 dislodges contaminating particles 26 from the moving semiconductor wafer 12 or component 12 to clean it.

The carbon dioxide snow spray 25 causes a buildup of static charge on the wafer 12 or component 12. The wafer 12 or component 12 is therefore grounded to prevent static charge buildup which attracts dislodged contaminating particles 26. This is accomplished using a vacuum chuck holder 33 that is grounded.

A carbon dioxide ($CO_2$) laser 30, operating at 10.6 microns, and powered by a laser power supply 32, produces a laser beam 31 that is generally aligned with the carbon dioxide snow spray 25 generated by the jet spray nozzle 24 so that the laser beam 31 and spray 25 partially or completely overlap. The laser beam 31 heats the surface of the wafer 12 or optical component 12 during cleaning to compensate for the cooling effects of the carbon dioxide snow spray 25, while the snow spray 25 is rastered over the wafer 12 or component 12 as it is cleaned.

The size of the laser beam 31 may be expanded to optimize heating of an area that is cooled by the snow spray 25. The heating provided by the laser beam 31 is adjusted to heat the surface of the wafer 12 or component 12 to about 40 degrees Celsius, which is optimum for carbon dioxide jet spray cleaning. There is no absorption of the carbon dioxide snow at the 10.6 microns wavelength because the extinction coefficient $k<0.0001$. Thus, the carbon dioxide snow spray 25 has no effect on transmission of the laser beam 31.

During operation, liquid carbon dioxide is supplied to the jet spray nozzle 24 by way of the liquid carbon dioxide manifold 22. Carbon dioxide snow spray 25 is produced by the jet spray nozzle 24 and impinges upon the surface of the wafer 12 or component 12. The action of the jet spray 25 cleans the contaminating particles 26 from the surface of the wafer 12 or component 12. The removed contaminating particles 26 are swept away by the flow of air or inert gas and are filtered by the HEPA filter 18.

The present cleaning method involves spraying the wafer 12 or component 12 with a carbon dioxide snow spray 25 at a shallow angle, approximately thirty degrees relative to horizontal, which effectively dislodges contaminating particles 26 from the surface of the wafer 12 or component 12. The laser beam 31 simultaneously irradiates the surface of the wafer 12 or component 12 while is it cleaned by the carbon dioxide snow spray 25.

The spray 25 is directed so that any contaminating particles 26 dislodged from the wafer 12 or component 12, or interior walls of the environmental cleaning station 15, are captured by the recirculating air system that filters the air before it re-enters the cleaning station 15. This process is successful in removing greater than ninety-five percent of all contaminating particles 26 smaller than ten microns from contaminated wafer 12 or component 12.

The laser beam 31 provided by the carbon dioxide laser 30 vaporizes capillary liquid on the wafer 12 or component 12, which reduces capillary forces that tend to secure contaminating particles 26 to the surface of the wafer 12 or component 12. The surface of the wafer 12 or component 12 is heated to a preferred temperature (40 degrees Celsius), which permits the supercritical carbon dioxide snow to operate as an optimum organic solvent. The laser beam 31 also imparts thermal energy to dislodged contaminating particles 26, which helps to remove them from the surface of the wafer 12 or component 12. Also, the laser beam 31 reheats the surface of the wafer 12 or component 12 after cleaning to help to return it to a more elevated temperature.

The cleaning station 15 forms a controlled environmental enclosure that is similar to a process enclosure disclosed in U.S. Pat. No. 5,316,560 entitled "Environment Control Apparatus", which is assigned to the assignee of the present invention, the contents of which are incorporated herein by reference. The cleaning station 15 is constructed and operates in a manner similar to the controlled environmental enclosure disclosed in this patent.

The jet spray nozzle 24 produces a jet spray 25 of gaseous and solid carbon dioxide material (snow) that is used to clean the surface of the wafer 12 or component 12. The carbon dioxide snow spray 25 comprises solid carbon dioxide particles and gas and is sprayed from the jet spray nozzle 24 onto the wafer 12 or component 12 to clean it. Momentum transfer between the solid carbon dioxide particles in the carbon dioxide snow spray 25 and contaminating particles 26 on sprayed surface of the wafer 12 or component 12 removes the contaminating particles 26 from the surface.

Excess snow from the jet sprays 25 and contaminating particles 26 dislodged from the surface of the wafer 12 or component 12 are collected by the HEPA filter 18 and are removed by the laminar air flow screen 17. The high capacity blower system 16 thus supplies a clean air or gas flow to the cleaning station 15.

Thus, a liquid carbon dioxide jet spray cleaning system and method employing a laser and carbon dioxide snow to clean semiconductor wafers and optical components, and the like, have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus for cleaning a surface of a wafer or component, comprising:

a processing system comprising a moving web;

an environmental cleaning station disposed adjacent to the moving web and through which the web moves, and which comprises a recirculating blower system, a laminar flow screen, a high efficiency particulate air filter, and a ducting system for recirculating purified air or inert gas;

a carbon dioxide jet spray cleaning system comprising a jet spray nozzle disposed within the cleaning station that is coupled by way of a manifold to a liquid carbon dioxide tank that supplies liquid carbon dioxide to the jet spray nozzle, and wherein the jet spray nozzle generates a carbon dioxide snow spray that impinges on the surface of the wafer or component to clean it; and a carbon dioxide laser for generating a laser beam that is generally aligned with the carbon dioxide snow spray generated by the jet spray nozzle and wherein the laser beam and spray overlap on the surface of the wafer or component.

2. The apparatus of claim 1 wherein the laser beam heats the surface of the wafer or component during cleaning to compensate for cooling effects of the carbon dioxide snow spray while the snow spray impinges upon the wafer or component as it is cleaned.

3. The apparatus of claim 1 wherein the heating provided by the laser beam is adjusted to heat the surface of the wafer or component to about 40 degrees Celsius, which is optimum for carbon dioxide jet spray cleaning.

* * * * *